United States Patent [19]

Strunk et al.

[11] Patent Number: 4,495,577
[45] Date of Patent: Jan. 22, 1985

[54] MODEL REFERENCE ADAPTIVE IMPLEMENT CONTROL

[75] Inventors: Richard D. Strunk, East Moline; Robert E. Kasten, Moline, both of Ill.; Richard V. Monopoli, deceased, late of Hadley, Mass., by Eileen F. Monopoli, executrix

[73] Assignee: Deere & Company, Moline, Ill.

[21] Appl. No.: 405,835

[22] Filed: Aug. 6, 1982

[51] Int. Cl.³ ............................................. A01B 63/112
[52] U.S. Cl. ...................................... 364/424; 172/7; 364/150
[58] Field of Search ...................... 172/2, 3, 4, 7, 8, 9, 172/10, 11, 12; 37/DIG. 1; 414/699, 700, 701; 364/149, 150, 151, 424; 340/684, 685, 680

[56] References Cited

U.S. PATENT DOCUMENTS

| | | | |
|---|---|---|---|
| 3,860,074 | 1/1975 | Maistrelli | 172/7 |
| 3,920,965 | 11/1975 | Sohrwardy | 364/149 |
| 4,013,875 | 3/1977 | McGlynn | 364/424 |
| 4,044,838 | 8/1977 | Wooldridge | 172/2 |
| 4,064,945 | 12/1977 | Haney | 172/4 |
| 4,195,337 | 3/1980 | Bertrand et al. | 364/151 |
| 4,300,638 | 11/1981 | Katayama et al. | 172/10 |
| 4,385,353 | 5/1983 | Schneider | 364/424 |

FOREIGN PATENT DOCUMENTS 2927585 4/1980 Fed. Rep. of Germany.

OTHER PUBLICATIONS

R. V. Monopoli, "Model Reference Adaptive Control with an Augmented Error Signal", IEEE Transactions on Automatic Control, Oct. 1974.

*Primary Examiner*—Richard T. Stouffer

[57] ABSTRACT

A tractor-mounted hitch is movable to control the working depth of an implement in response to control signals generated by a model reference adaptive control system. The control system senses draft force and rockshaft position and receives operator-controlled reference signals representative thereof. A model reference adaptive draft control signal is derived from a model error signal, an adaptive gain value and a compensated position feedback term. A position error control signal is also generated. One or the other of the control signals is used to control the implement, depending upon whether or not the implement is in the ground and depending upon the relationship of the control signals.

12 Claims, 6 Drawing Figures

MODEL REFERENCE ADAPTIVE IMPLEMENT CONTROL

BACKGROUND OF THE INVENTION

This invention relates to a control system for controlling the working depth of an implement pulled by an agricultural vehicle.

The quality of operation of conventional hitch control systems, such as draft and/or position-responsive systems, may vary, depending upon the particular implement being used or upon the particular soil conditions encountered. For example, a particular control system with a fixed gain may operate sluggishly under relatively loose soil conditions, whereas the same control system may cause undesirably rapid, violent or unstable hitch and implement motions when working in relatively stiff soil conditions. One solution would be to provide a variable gain control which can be adjusted by the vehicle operator to optimize performance under various conditions. However, it would be desirable to provide a hitch or implement control system which automatically compensates for varying conditions without increasing the level of skill or effort required of the operator.

SUMMARY OF THE INVENTION

An object of the present invention is to provide an implement control system which automatically compensates for variations in soil conditions and/or implement characteristics.

Another object of the present invention is to provide a model reference adaptive control system to automatically adjust the controller gain to compensate for different implements and soil conditions.

Another object of the present invention is to provide a multi-mode implement control system wherein one of the control modes is a model reference adaptive control mode.

A further object of the present invention is to provide a multi-mode implement control system wherein one or the other of the control modes is operative, depending upon whether the implement is in or out of the ground.

These and other objects are achieved by the present invention which includes sensors for sensing implement-created draft force and implement or hitch position. The present control system also includes operator-adjustable means for setting signals representing desired draft force (load command) and desired implement position. Error signals are generated representing the deviation of these sensed parameters from the desired levels. A control algorithm produces a model error signal representing a difference between the actual response of the hitch and implement to a load error signal and the response of a reference model to the load error signal. A draft error control signal is derived from the reference model error signal, the load error signal and a position feedback signal which is compensated by an amount corresponding to the rockshaft position where the draft force level first deviates from a zero draft force level. The implement is controlled in response to the draft error control signal only when the implement is in the ground. A predetermined constant draft error signal is generated when the implement is out of the ground. One or the other of the draft error or position error signals is applied to a control valve to raise and lower the implement, depending on their relationship.

DETAILED DESCRIPTION

Figure 1:
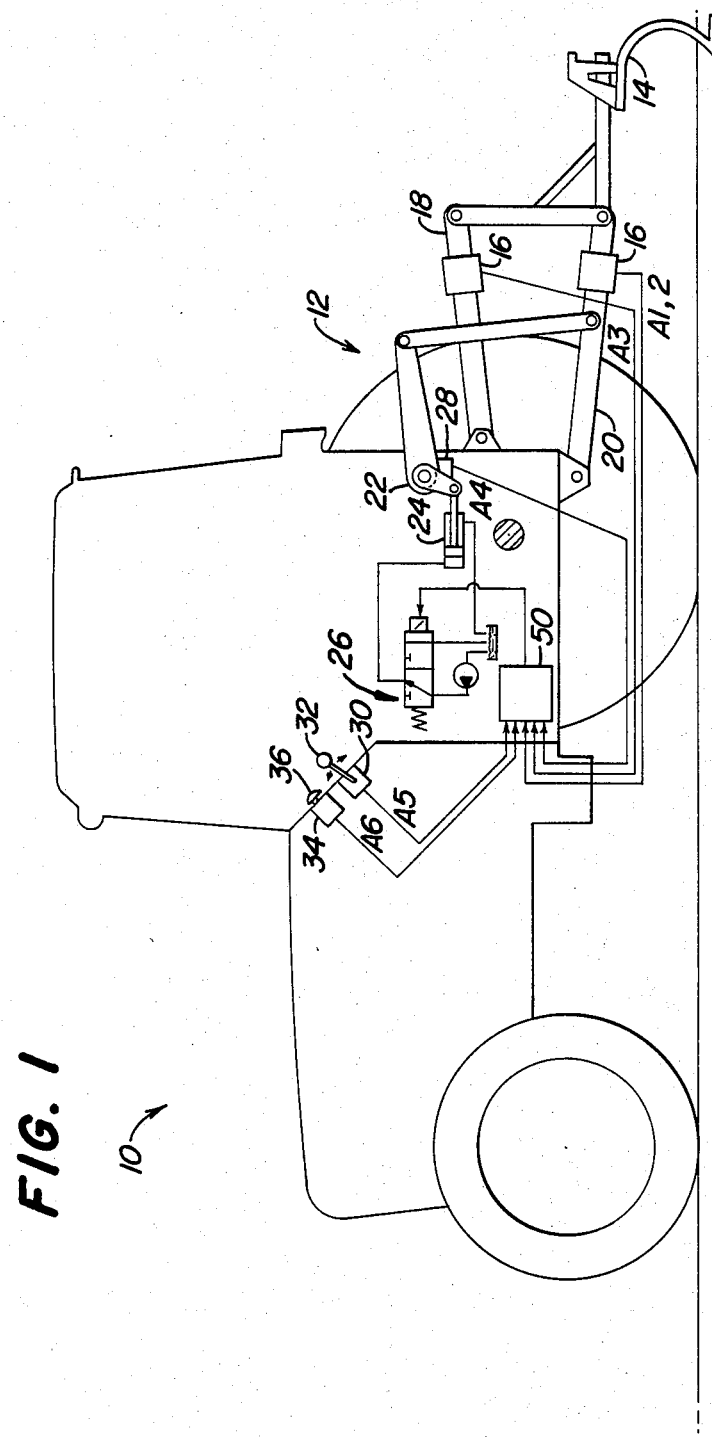
FIG. 1 is a schematic drawing of an agricultural vehicle, hitch and implement suitable for use with the present invention.
Figure 2A:
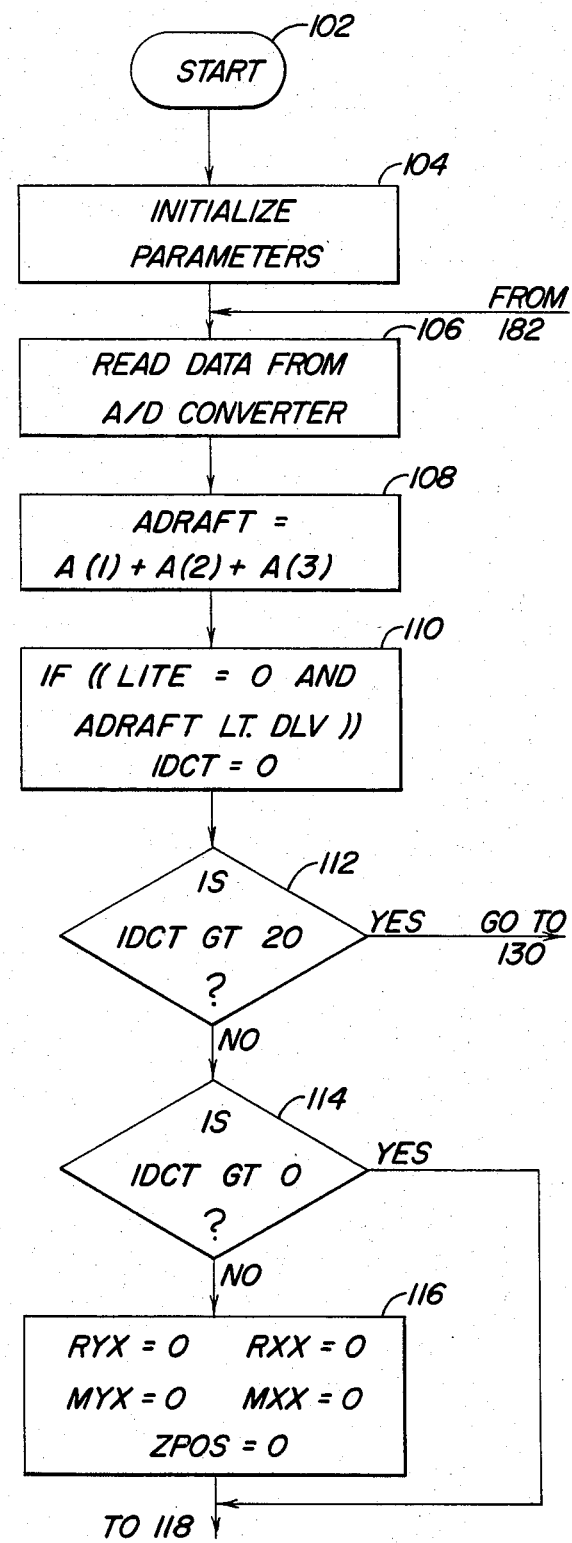
FIGS. 2a–e are flow charts of the algorithm performed by the central control unit of the present invention.
Figure 2B:
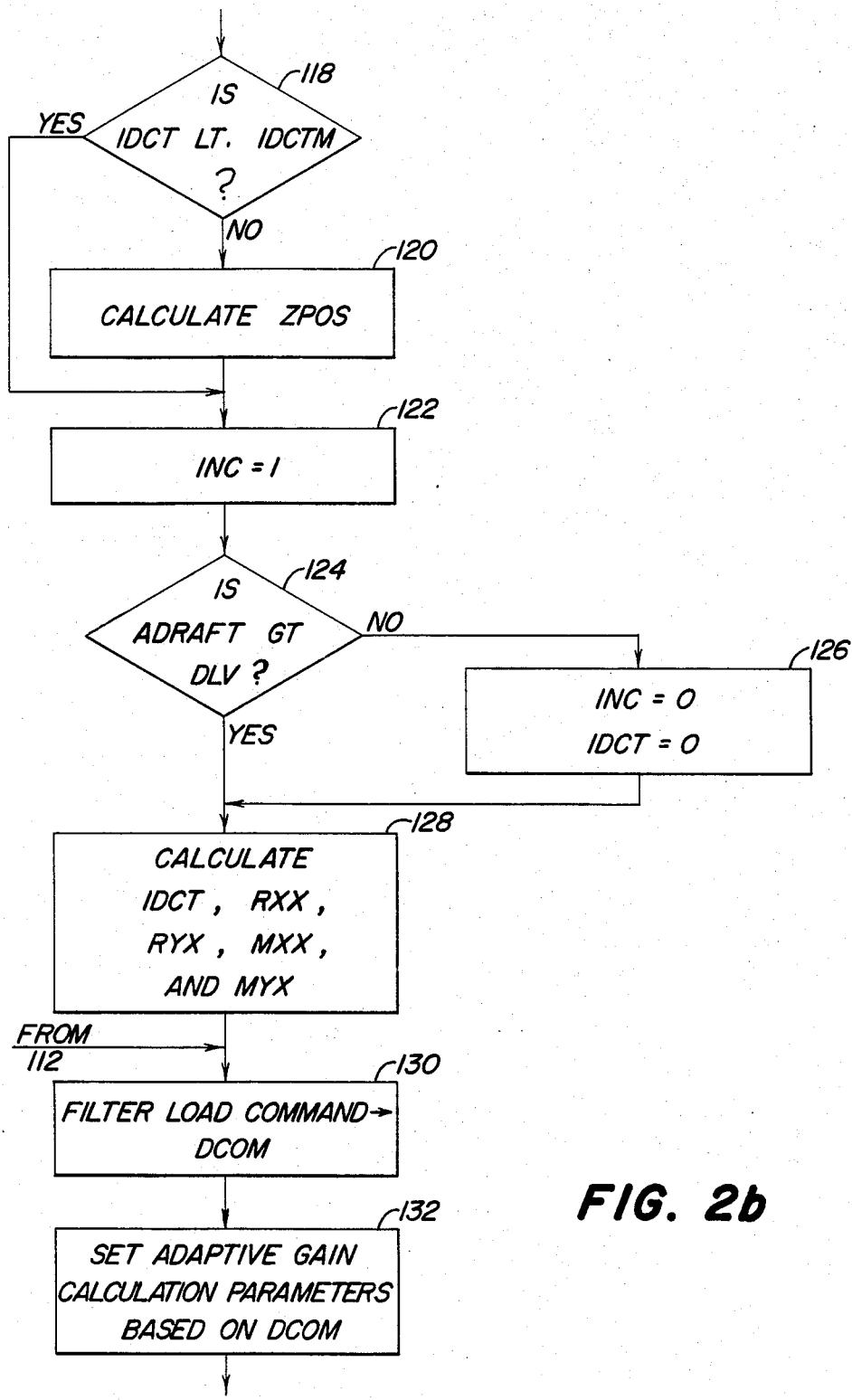
Figure 2C:
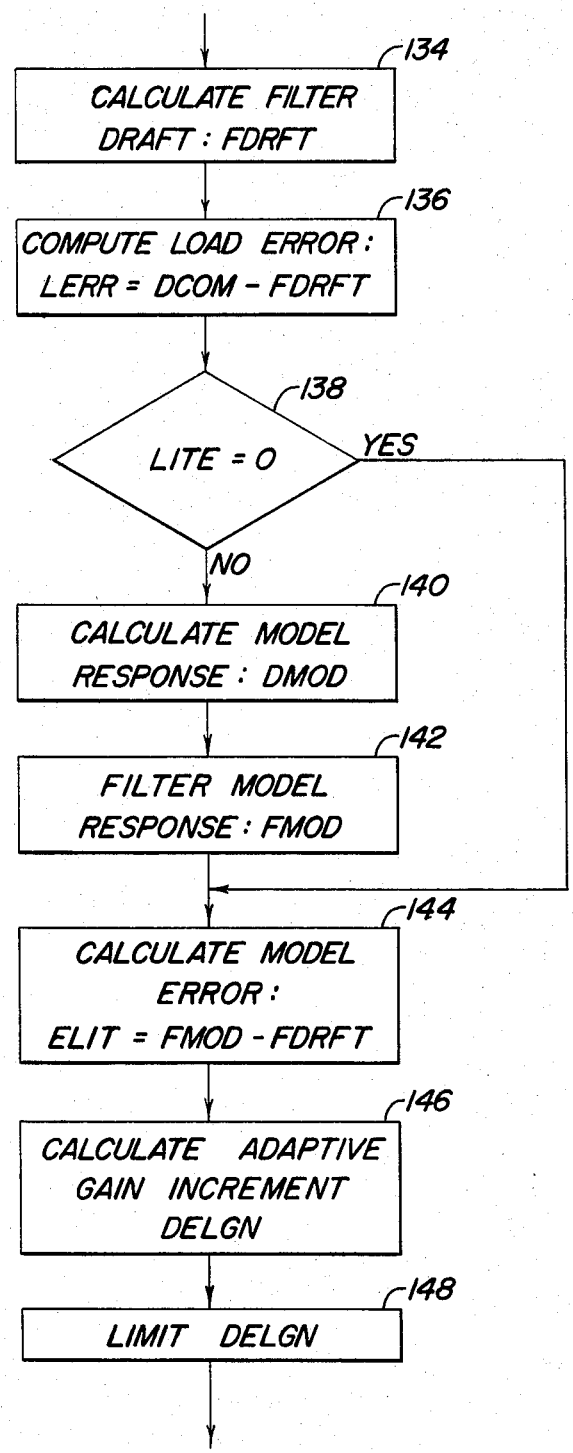
Figure 2D:
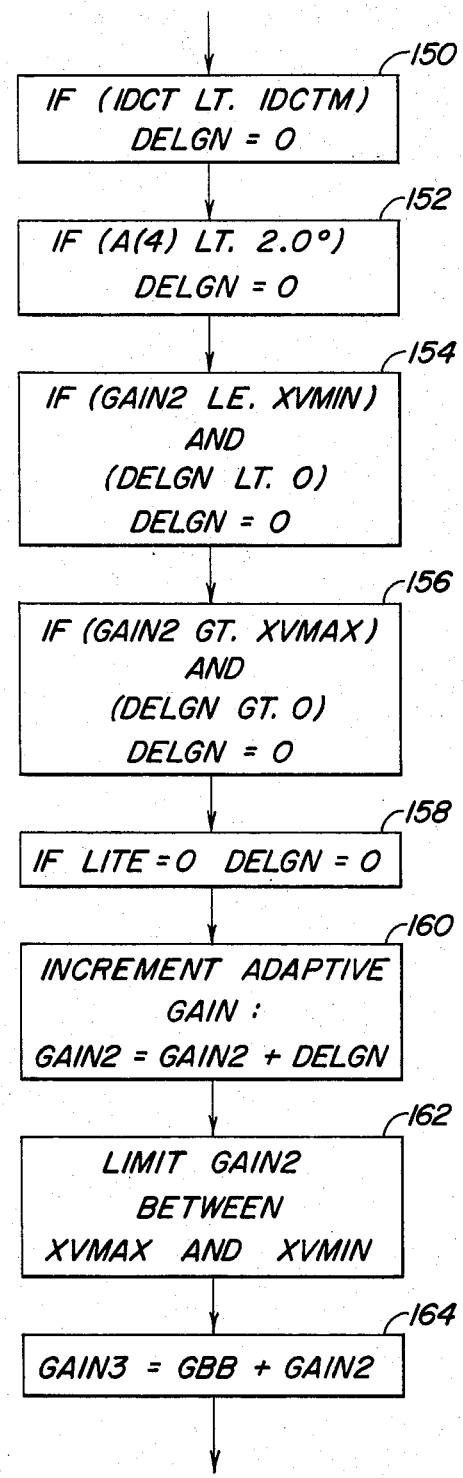
Figure 2E:
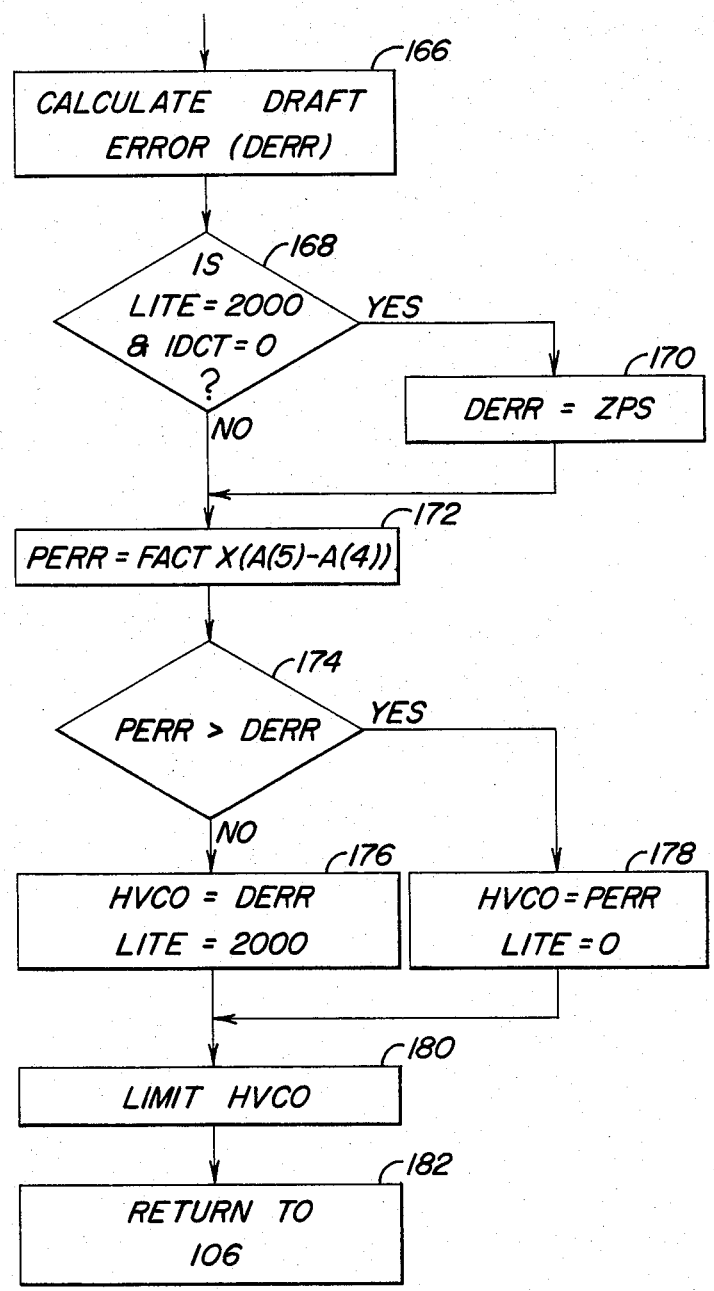

An agricultural tractor 10 includes a conventional hitch 12, such as a three-point hitch, for coupling to a conventional ground-engaging implement 14, such as an integrally mounted chisel plow. Draft forces generated by the plow-ground interaction are sensed by conventional draft sensors 16, such as strain gauges, variable transformer draft sensors, such as described in U.S. patent application, Ser. No. 332,577, filed Dec. 21, 1981, or the equivalent. For example, three draft sensors could be used, one inserted in the center link 18, the other two inserted in the draft links 20, one of which is visible in FIG. 1. The three draft sensors 16 generate three separate signals having scaler values A(1), A(2) and A(3). The hitch 12 includes a conventional rockshaft 22 which is rotated by one or more connected hydraulic cylinders 24 to raise and lower the hitch 12 and implement 14. The cylinders 24 may be controlled by a known electrically operated control valve 26, such as a Moog series 72 servo valve. A potentiometer-type sensor 28 senses the position of the rockshaft 22 and generates a signal A(4) which represents the position of the rockshaft 22 and the position of the implement 14. A potentiometer sensor 30 generates a signal A(5) which represents the position of an operator-movable rockshaft position command lever 32. Another potentiometer 34 generates a load command signal, A(6), representing the position of an operator-rotatable load command knob 36. The operator-controlled devices 32 and 36 may be positioned at any convenient location in the operator's compartment of the tractor.

The signals from the sensors 16, 28, 30 and 34 are communicated to an electronic control unit 50 which generates valve control signals which are communicated to the control valve 26. The control unit 50 could include a conventional analog-to-digital converter (not shown) for converting the signals from sensors 16, 28, 30 and 34 to digital representations thereof, a conventional microcomputer (not shown) and a conventional digital-to-analog converter and power amplifier (not shown) for converting the digital control signal, HVCO, from the microcomputer to an analog voltage or current which is then applied to the control valve 26. The control signal, HVCO, is generated as a function of the sensed inputs according to an operational program or algorithm 100. The algorithm 100 is represented by the flow chart shown in FIGS. 2a–e, which includes Fortran type statements.

The algorithm 100 starts at step 102. Then, in step 104, various values are initialized or reset. In particular, the following values are initialized to zero: the FDRFT, or filtered draft value, the DMOD or reference model output value and the FMOD or filtered reference model output value. In addition, a variable component value, GAIN2, of a variable forward path gain value, GAIN3, is set equal to a minimum forward path gain value of 0.04, for example. Finally, all other variables, which would otherwise be undefined at the time they are first introduced in the following algorithm steps, are initialized to zero.

Next, in step 106, digital values corresponding to signals A(1)–A(5) are read from the analog-to-digital converter (not shown). Further, a load command value, DCOM, is assigned a current value representing the signal A(6) from load command sensor 34. Then, in step 108, a sensed draft force value, ADRAFT, is calculated by summing together the separate signals A(1), A(2) and A(3) from the three draft sensors 16.

Next, the algorithm enters a portion comprising steps 110 through 128 wherein the rockshaft angle at which the implement enters the ground is determined. First, in step 110, a loop counter value, IDCT, is set equal to zero if a position control flag value, LITE, is less than a threshold draft value, DLV, representing 5KN, for example. Next, step 112 routes the algorithm to step 130 if the IDCT value is greater than a maximmum loop count value, 20, for example, otherwise the algorithm proceeds directly to step 114. Step 114 routes the algorithm to step 118 if the IDCT value is greater than zero (indicating that it is not the first pass through the algorithm, otherwise, the algorithm proceeds directly to step 116.) In step 116, intermediate calculation variables RYX, RXX, MYX, MXX and BETA are all set equal to zero.

Next, step 118 directs the algorithm to step 122 if the IDCT value is less than the maximum loop count value, 20, (indicating less than 20 passes through the algorithm), otherwise, the algorithm proceeds to step 120. In step 120, the output variable, ZPOS, is calculated according to the equation:

$$ZPOS = ((RXX \times MYX) - (RYX \times MXX))/((MXX \times MYX) - (RYX \times IDCT))$$

Thus, in step 120, the ZPOS value is assigned a value which represents the rockshaft angle or position at which the implement 14 enters the ground or which corresponds to zero draft force. Next, in step 122, an increment value, INC, which depends upon whether or not the draft force value, ADRAFT is non-zero, is set equal to 1.

Then, step 124 directs the algorithm to step 126 if the ADRAFT value is greater than the threshold value, DVL, otherwise, the algorithm proceeds directly to step 128. In step 126, the INC and IDCT values are set equal to zero before proceeding to step 128. Finally, in step 128, the loop counter value, IDCT, is increased by the increment, INC, and the intermediate calculation variables are calculated according to the following statements:

$$RXX = RXX + (INC \times A(4) \times A(4));$$

$$RYX = RYX + (INC \times A(4) \times ADRAFT);$$

$$MXX = MXX + (INC \times A(4); \text{ and}$$

$$MYX = MYX + (INC \times ADRAFT).$$

Thus, after the implement 14 has entered the ground and has produced non-zero values for the draft force value, ADRAFT, the repetition of steps 110–128 will ultimately produce a ZPOS value in step 120 which represents the rockshaft position or angle at which the implement entered the ground. However, if the sensed draft force represented by the ADRAFT value is not greater than the threshold value DLV, then steps 126, along with steps 114 and 116 of the next pass through the algorithm, will re-initialize the intermediate variables RYX, RXX, MYX, MXX and BETA. Thus, the ground entry rockshaft angle will be redetermined every time the implement is lifted out of the ground and then lowered again.

Next, in step 130, a filtered load command value, DCOM, is calculated from the statement $DCOM = (DCOM \times 0.99) + (A(6) \times 0.01)$. Then, in step 132, a positive valued load command value, DDCOM, is set equal to the absolute value of the filtered load command value, DCOM, from step 130. Also, in step 132, an adaptive integrator gain value, GAA and a "fixed" gain component value, GBB, are derived from the DDCOM value according to the following statements:

If $(DDCOM \cdot LT1) \, DDCOM = 1$;

$GAA = (GA \times 20)/DDCOM$, where GA is a maximum adaptive integrator gain value of 0.0005, for example;

$GBB = (GB \times 400)/(DDCOM \times DDCOM)$, where GB is a maximum gain value. (From these equations, it can be seen that the adaptive gain value GAA is inversely related to the DCOM value, and that adaptive gain value GBB is inversely related to the square of the draft command value, DCOM.)

If $(GAA \cdot GT \cdot GA) GAA = GA$;

If $(GAA \cdot LT \cdot GMIN) GAA = GMIN$, where GMIN is a minimum adaptive integrator gain value of 0.00005, for example; and If $(GBB \cdot GT \cdot GB) GBB = GB$.

It was found that it was appropriate to set GB equal to zero. It follows, therefore, from the above statements, that GBB will also be zero. Thus, the third and last statements above are significant only in the general case where GB is not equal to zero.

Next, in step 134, a digitally filtered or average draft value, FDRFT, is derived from the sensed draft force value, ADRAFT, by the statement:

$$FDRFT = (FDRFT \times TP1) + (ADRFT \times (1 - TP1)),$$

where TP1 is a filtering parameter of 0.1667, for example. Then, in step 136, a load error value, LERP, is calculated from the statement: $LERR = DCOM - FDRFT$.

Step 138 then directs the algorithm forward to step 144 if the control mode flag value, LITE, equals zero, indicating that the hitch is being controlled in response to a position error rather than in response to the load error value from step 136. Otherwise, the algorithm proceeds directly to the reference model calculations contained in steps 140 and 142.

First, in step 140, a model signal, DMOD, representing the response of an ideal model to the load error, LERR, is calculated according to the statement:

$$DMOD = (DMOD \times TP2) + (FK1 \times LERR \times (1 - TP2)),$$

where TP2 and FK1 are reference model parameters of, for example, 0.96 and 1.5, respectively. Thus, the model represented by the equation in step 140 is a first order model which would be analogous to a simple series RC electrical circuit wherein the LERR value would be represented by a voltage applied across the RC circuit and where the DMOD value would be represented by the voltage across the capacitor. The filtering equations in steps 130, 134 and 142 have similar first order analogies.

Then, in step 142, a filtered model signal, FMOD, is derived from the DMOD value by the statement:

$FMOD = FMOD \times TP1 + DMOD \times (1 - TP1)$.

Next, in step 144, the error ELIT, or difference between the response of the ideal model and the response of the actual physical system is calculated according to the statement:

$ELIT = FMOD - FDRFT$.

Then, in step 146, a DELGN value is calculated to represent the required amount by which the adaptive gain value, GAIN2, is to be incremented in later step 160. Specifically, the DELGN value is determined by the statement:

$DELGN = G11 \times GAA \times ELIT \times LERR$, where G11 is a value corresponding to the time period between cycles of this algorithm, 0.01 seconds, for example. Thus, the DELGN value will be proportional to a product of the model error value, ELIT, and the load error value, LERR.

In step 148, the DELGN value is limited between upper and lower values +ALIM and −ALIM by the logic statement:

If $(DELGN \cdot GT \cdot ALIM) DELGN = ALIM$ and

If $(DELGN \cdot LT \cdot ALIM) DELGN = -ALIM$, where ALIM is limit value of 1.00, for example.

Then, in steps 150–158, a series of logic "if" statements are used to set the adaptive gain increment value, DELGN to zero so that the GAIN2 value will not be changed in later step 160 under the following conditions. First, step 150 sets DELGN=0 if the IDCT value is less than the IDCTM value, as would be the case if the rockshaft ground entry value ZPOS had not yet been determined at step 120, because the implement has not yet entered into the ground. Similarly, step 152 sets DELGN=0 if the rockshaft angle is less than 2 degrees above its lowest possible angular position. This prevents later step 160 from generating undesirably large GAIN2 values merely because the setting of the load command knob 36 is so high that the implement 14 is held at or near its deepest possible ground penetration. Steps 154 and 156 prevent incrementing of the GAIN2 value in step 160 when the GAIN2 value is already at either of limit values XVMIN=0.04 or XVMAX=4.5. These are believed to be the extreme gain values required for the worst expected soil and implement variations. Finally, step 158 prevents changing of the DELGN value when the flag value, LITE=0, as when the implement is raised out of the ground at the end of a field. Thus, the current GAIN2 value is retained for use once the implement re-enters the ground.

Then, in step 160, the adaptive gain value, GAIN2, is incremented by adding the DELGN value (as determined in steps 146–158) to the previous GAIN2 value. In this manner, multiple passes through the algorithm will cause the GAIN2 value to be an integral function of the DELGN value from step 146. Next, in step 162, the GAIN2 value is limited to between the limit values XVMAX and XVMIN by the logic "if" statements:

If $(GAIN2 \cdot GT \cdot XVMAX) GAIN2 = XVMAX$ and

If $(GAIN2 \cdot LT \cdot XVMIN) GAIN2 = XVMIN$.

Then, in step 164, a total forward path gain or adaptive gain value, GAIN3, is calculated according to the equation:

$GAIN3 = GBB + GAIN2$.

In step 166, a draft error value for draft control, DERR, is calculated by the equation: $DERR = FACT \times (GAIN3 \times LEPR + ZPOS - A(4))$, where FACT is a chosen gain factor of 17.5, for example, and the other variables are as determined previously in the algorithm.

Thus, the draft error value, DERR, includes a term which is proportional to a product of the adaptive gain value, GAIN3, and the load error value, LERR. The draft error value, DERR also includes a term proportional to a difference between the ground entry rockshaft position value, ZPOS and the sensed rockshaft position value, A(4). This latter term constitutes a position feedback compensated by the ZPOS value so that a zero setting of the load command control 36 will cause the implement to be held in a position just skimming above the ground.

Step 168 then directs the algorithm to step 170 if LITE=2000 and if IDCT=0, as would be the case if the control system were in its draft or load control mode (not in position control), but the implement had not yet entered the ground. Otherwise, the algorithm proceeds directly to step 172. In step 170, the draft error value DERR is set equal to a constant entry rate value, ZPOS=−200, which would cause the implement to lower at a desired constant velocity.

In step 172, a position error value, PERR, is calculated from the equation: $PERR = FACT \times (A(5) - A(4))$, so that the PERR value is proportional to the difference between the desired rockshaft angle represented by A(5) and the actual or sensed rockshaft angle represented by A(4).

Next, step 174 directs the algorithm to step 178 if the position error value is greater than the draft error value DERR, otherwise, the algorithm proceeds to step 176. In step 176, the valve control signal, HVCO, is assigned the value of the draft error value DERR and the flag value, LITE, is set equal to 2000 to indicate that the hitch 12 and implement are being controlled in response to the draft error value, DERR. On the other hand, step 178 sets the value command value, HVCO, equal to the position error value, PERR and sets LITE=0 to indicate that the hitch and implement are being controlled in response to a position error value.

In step 180, the value command value, HVCO is limited between upper and lower limits according to the logic "if" statements:

If $(HVCO \cdot GT \cdot 400) HVCO = 400$ and

If $(HVCO \cdot LT \cdot -400) HVCO = -400$.

Finally, step 182 directs the algorithm to return to step 106 so that the algorithm can be repeated. Preferably, the algorithm is repeated every 0.01 seconds, although other repetition rates could be used if certain of the values described previously were modified.

In operation, the implement lowers at a constant velocity until the implement enters the ground, whereupon the draft force increases as the implement lowers further. Multiple passes through the portion of the algorithm comprising steps 110–128 ultimately provides (in step 120) a ground-entry value, ZPOS, which represents the rockshaft angle which corresponds to a zero draft force or the point when the implement is just beginning to enter the ground. The repetitive application of steps 120 through 128 constitutes an application of a standard mathematical calculation method known as the "least squares fit" technique. In this case, a number of data points representing draft force versus rockshaft position are produced. The calculation technique then derives from these data points the slope and intercept of a line which best fits these data points according to the least squares technique. The intercept of this line is the ZPOS value and is an estimate, derived by the "least squares fit" method of the rockshaft position which corresponds to zero draft force. This ZPOS value is used, as described previously, as part of the compensated position feedback term in the calculation of the draft error value, DERR, in step 166.

It should be noted that an erroneous ZPOS value can produce an incorrect DERR value in 166, which can then produce an unwanted readjustment of the implement depth. This, in turn, would produce an incorrect draft force value, ADRAFT, which would lead via step 134–166 to the generation of an incorrect adaptive gain value, GAIN2. If the adaptive gain value GAIN3 is too low, the system will be sluggish in responding to draft force variations, whereas if the GAIN3 value is too high, the system response will be oscillatory or unstable. The above described system for determining ZPOS helps to produce a correct adaptive gain value GAIN3.

Note that due to steps 110, 114, 116 and 124 and 126, the IDCT value will be zero and no ZPOS value will be determined in step 120 as long as the actual sensed draft force, ADRAFT, is less than the draft thereshold value, DLV, which would be the case before the implement has entered the ground. Step 150 thereafter operates to set the adaptive gain increment value, DELGN, to zero when the IDCT value is zero, so that the adaptive gain value GAIN2 and the total gain value, GAIN3, will be held at the minimum value of XVMIN. In this manner, integration of the GAIN2 and GAIN3 values in steps 160 and 164 is prevented until the implement has entered the ground.

Note, also, that steps 168 and 170 operate to set the draft error value, DERR, equal to the constant value, ZPS, whenever the loop is in the draft control mode and the implement has not yet entered the ground, as indicated by IDCT=0. This means that the model reference adaptive gain aspect of this control algorithm (as implemented by steps 140–166) has no effect upon the control signal, HVCO, or upon the hitch 12 and implement 14, unless the implement has entered the ground. This is desirable since the model represented by step 140 assumes that there is a continuous relationship between implement position and draft. Of course, this is actually the case only when the implement is in the ground, since there may be discontinuities in the draft force as the implement enters the ground level. Similarly, steps 168 and 170 nullify the effect of the model reference adaptive gain aspect of this control algorithm whenever the hitch 12 and implement 14 are in a position responsive control mode wherein LITE is set equal to zero by operation of steps 174 and 178, as in the case where the operator raises the implement for turnaround at the end of the field or when hitching to a new implement.

However, when the implement 14 is in the ground and not in a position-responsive control mode, then the above described model reference adaptive control algorithm operates to control the hitch 12 and implement 14 without requiring frequent adjustments by the operator to compensate for changing conditions, such as soil variations or a change of implement. Accordingly, the algorithm 100 provides, via steps 110–128, means for determining when the implement is in the ground so that the model reference adaptive control mode can be made operational at the proper time.

The conversion of the above described flow chart into a standard language for implementing the algorithm 100 in a digital data processor, such as a microcomputer, will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In a control system for a vehicle having connecting means for attaching a ground-penetrating implement thereto and actuating means for raising and lowering the connecting means in response to control signals applied to an input thereof to vary the ground penetration of the implement, the improvement wherein the control system comprises:
    means for generating a load error signal derived from sensed implement draft force;
    means for generating a position signal representing sensed implement position;
    adaptive means responsive to sensed operating parameters of the implement and connecting means for generating a variable gain signal, the variable gain signal automatically varying to compensate for changes in implement and ground conditions;
    means for generating an adaptive control signal as a function of the load error signal multiplied by the variable gain signal and of the position signal; and
    applying means for applying the control signal to the input of the actuating means.

2. The control system of claim 1, further comprising:
    reference model means for converting the load error signal to a model signal representing a response of a model system to the load error signal;
    means for generating an actual response signal representing a response of the implement and connecting means to the load error signal; and
    difference means for generating a model error signal representing a difference between the model signal and the actual response signal, the adaptive means generating the variable gain signal as a function of the model error and load error signals.

3. In a control system for a vehicle having connecting means for attaching a ground-penetrating implement thereto and actuating means for raising and lowering the connecting means in response to control signals applied to an input thereof to vary the ground genetration of the implement, the improvement wherein the control system comprises:
    means for generating a load error signal representing a difference between a sensed implement draft force and an operator-established desired draft force value;
    means for generating a position signal representing a sensed position of the implement;
    reference model means for generating a model signal representing a response to a model system to the load error signal;
    means for generating an actual response siganl representing a response of the implement and connecting means to the load error signal;
    difference means for generating a model error signal representing a difference between the model signal and the actual response signals;
    means for generating an adaptive control signal as a function of the model error siganl, the position signal and the load error signal; and applying means for applying the adaptive control signal to the input of the actuating means.

4. In a control system for a vehicle having connecting means for attaching a ground-penetrating implement thereto and actuating means for raising and lowering the connecting means in response to control signals applied to an input thereof to vary the ground penetration of the implement, the improvement wherein the control system comprises:

means for generating a draft signal representing an actual draft force produced by implement-ground interaction;

means for generating a position signals representing a sensed position of the implement;

means for generating a load error signal representing a difference between the draft signal and a desired draft force;

reference model means for converting the load error signal to a model signal representing the response of a predetermined model system to the load error signal;

difference means for generating a model error signal representing a difference between the model signal and the draft signal;

means for deriving the control signal from the position, the model error and load error signals; and means for applying the control signal to the input of the actuating means.

5. In a control system for a vehicle having connecting means for attaching a ground-penetrating implement thereto and actuating means for raising and lowering the connecting means in response to control signals applied to an input thereof to vary the ground penetration of the implement; the improvement wherein the control system comprises:

means for generating a draft signal representing an actual draft force produced by implement-ground interaction;

means for generating a position signal representing a sensed position of the implement;

means for generating a load error signal representing a difference between the draft signal and a desired draft force;

reference model means for converting the load error signal to a model signal representing the response of a predetermined model system to the load error signal;

difference means for generating a model error signal representing a difference between the model signal and the draft signal;

means for deriving an adaptive gain signal from the model error and load error signals;

means for generating a control signal as a function of the position, load error and adaptive gain signals; and means for applying the control signal to the input of the actuating means.

6. In a control system for a vehicle having connecting means for attahcing a ground-penetrating implement thereto and actuating means for raising and lowering the connecting means in response to control signals applied to an input thereof to vary the ground penetration of the implement, the improvement wherein the control system comprises:

draft means for generating a load error signal representing a difference between a sensed draft force produced by implement-ground interaction and an operator-established reference draft force;

a position means for generating a position signal representing an actual sensed position of the implement;

ground entry sensing means for generating a ground entry position signal corresponding to a position of the implement which occurs as the implement begins to enter the ground;

difference means for generating a position feedback signal representing a difference between the position and ground entry signals;

combining means for generating the control signal as a function of the load error and position feedback signals; and means for applying the control signal to the input of the actuating means.

7. The control system of claim 6 wherein the ground entry sensing means comprises:

means for generating a plurality of data points, each data point having a first component corresponding to a value of the sensed draft force and having a second component corresponding to a position of the implement at said value of sensed draft force; and means for extrapolating from the plurality of data points a ground entry implement position corresponding to a zero value of draft force.

8. In a control system for a vehicle having connecting means for attaching a ground-penetrating implement thereto and actuating means for raising and lowering the connecting means in response to control signals applied to an input thereof to vary the ground penetration of the implement, the improvement wherein the control system comprises:

means for generating a draft signal representing a sensed actual draft force produced by implement-ground interaction;

means for generating a load command signal representing a desired draft force;

load error means for generating a load error signal representing a difference between the draft signal and the load command signal;

means for generating a position signal representing a sensed actual position of the implement;

means for generating a position command signal representing a desired position of the implement;

position error means for generating a position error control signal representing a difference between the position signal and the position command signal;

reference model means for converting the load error signal to a model signal representing the response of a predetermined model system to the load error signal;

difference means for generating a model error signal representing a difference between the model signal and the draft signal;

ground entry sensing means for sensing a relationship between the implement and the ground and for generating a ground entry signal representing a position of the implement as it begins to enter the ground;

means for generating a feedback signal representing a difference between the ground entry signal and the position signal;

means for generating an adaptive draft error control signal as a function of the load error, model error and feedback signals;

inhibit means responsive to the ground entry sensing means for making the draft error control signal non-adaptive when the implement is out of the ground;

selecting means for selecting one of the position error and draft error control signals, depending upon the relationship therebetween; and means for applying the selected control signal to the input of the actuating means.

9. In a control system for a vehicle having connecting means for attaching a ground-penetrating implement thereto and actuating means for raising and lowering the connecting means in response to control signals applied to an input thereof to vary the implement ground penetration, the improvement wherein the control system comprises:

means for generating a first signal derived from at least one sensed operating parameter of the implement and connection means;

reference model means for converting the first signal to a model signal representing a response of a model system to the first signal;

means for generating an actual response signal representing a response of the implement and connecting means to the first signal;

difference means for generating a model error signal representing a difference between teh model signal and the actual response signal;

adaptive means responsive to sensed operating parameters of the implement and connection means for generating a variable gain signal as a function of the model error and first signals, the variable gain signal varying to compensate for changes in implement and ground conditions;

means for generating an adaptive control signal as a function of at least the first signal and the variable gain signal;

ground entry sensing means for sensing a relationship between the implement and the ground;

inhibit means responsive to the ground entry sensing means for making the adaptive control signal non-adaptive when the implement is out of the ground; and applying means for applying the control signal to the input of the actuating means.

10. In a control system for a vehicle having connecting means for attaching a ground-penetrating implement thereto and actuating means for raising and lowering the connecting means in response to control signals applied to an input thereof to vary the implement ground penetration, the improvement wherein the control system comprises:

a parameter means for generating a parameter error signal representing a difference between a sensed operating parameter of the implement and connecting means and an operator-established desired value of the sensed operating parameter;

reference model means for generating a model signal representing a response of a model system to the parameter error signal;

means for generating an actual response signal representing a response of the implement and connecting means to the parameter error signal;

difference means for generating a model error signal representing a difference between the model signal and the actual response signals;

means for generating an adaptive control signal as a function of the model error signal and parameter error signals;

ground entry sensing means for sensing a relationship between the implement and the ground;

inhibit means responsive to the ground entry sensing means for making the adaptive control signal non-adaptive when the implement is out of the ground; and applying means for applying the control signal to the input of the actuating means.

11. In a control system for a vehicle having connecting means for attaching a ground-penetrating implement thereto and actuating means for raising and lowering the connecting means in response to control signals applied to an input thereof to vary the implement ground penetration, the improvement wherein the control system comprises:

means for generating a draft signal representing an actual draft force produced by implement-ground interaction;

means for generating a load error signal representing a difference between the draft signal and a desired draft force;

reference model means for converting the load error signal to a model signal representing the response of a predetermined model system to the load error signal;

difference means for generating a model error signal representing a difference between the model signal and the draft signal;

position sensing means for generating a sensed position signal representing an actual position of the implement;

ground entry sensing means responsive to the position signal and the draft signal for deriving therefrom a ground entry signal representing a position of the implement as it begins to enter the ground;

means for generating a feedback signal representing a difference between the ground entry and position signals;

means for deriving the control signal from the model error, load error and feedback signals; and means for applying the control signal to the input of the actuating means.

12. Thb control system of claim 11, wherein the ground entry sensing means comprises:

means for storing a plurality of data points, each data point having a first component corresponding to a value of the draft signal greater than a predetermined threshold and having a second component representing a position of the implement at said value of the draft signal; and means for extrapolating from the plurality of data points a ground entry implement position corresponding to a zero value of draft force.

* * * * *

UNITED STATES PATENT AND TRADEMARK OFFICE
CERTIFICATE OF CORRECTION

PATENT NO. : 4,495,577
DATED : 22 January 1985
INVENTOR(S) : Richard Dean Strunk et al It is certified that error appears in the above-identified patent and that said Letters Patent is hereby corrected as shown below:

Col. 8, lines 47 and 48 delete "genetration" and insert -- penetration --.
Col. 8, line 57, delete "to" (first occurrence) and insert -- of --.
Col. 8, line 59, delete "siganl" and insert -- signal --.
Col. 8, line 66, delete "siganl" and insert -- signal --.
Col. 9, line 13, delete "signals" and insert -- signal --.
Col. 9, line 59, delete "attahcing" and insert -- attaching --.
Col. 11, line 27, delete "teh" and insert -- the --.
Col. 12, line 52, delete "Thb" and insert -- The --.

Signed and Sealed this

Thirty-first Day of December 1985

[SEAL]

Attest:

DONALD J. QUIGG

Attesting Officer    Commissioner of Patents and Trademarks